United States Patent [19]
Hare

[11] Patent Number: 5,357,878
[45] Date of Patent: Oct. 25, 1994

[54] BURNER TILT FEEDBACK CONTROL

[76] Inventor: Michael S. Hare, c/o Virginia Power, Innsbrook Technical Center, 5000 Dominion Blvd., Glen Allen, Va. 23060

[21] Appl. No.: 34,761

[22] Filed: Mar. 19, 1993

[51] Int. Cl.⁵ ............................................. F23H 5/00
[52] U.S. Cl. ..................... 110/185; 91/361; 122/479.3; 318/663
[58] Field of Search .......... 110/185; 122/449, 479.3; 91/1, 35, 385 A, 361; 318/663, 672

[56] References Cited

U.S. PATENT DOCUMENTS

| | | |
|---|---|---|
| 2,575,885 | 11/1951 | Mittendorf . |
| 2,608,168 | 8/1952 | Jackson . |
| 2,800,888 | 7/1957 | Miller et al. . |
| 3,452,645 | 7/1969 | Baltrop ................................ 91/1 |
| 4,037,519 | 7/1977 | Miller et al. . |
| 4,191,913 | 3/1980 | Arnold et al. . |
| 4,207,507 | 6/1980 | Hermie . |
| 4,250,440 | 2/1981 | Lee . |
| 4,252,069 | 2/1981 | McCartney . |
| 4,304,196 | 8/1981 | Chadshay et al. . |
| 4,377,134 | 3/1983 | Frey . |
| 4,434,747 | 3/1984 | Chadshay . |
| 4,569,311 | 2/1986 | Llinres, Jr. . |
| 4,854,498 | 8/1989 | Stayton . |
| 4,881,450 | 11/1989 | Hirata et al. . |
| 4,986,380 | 1/1991 | Morishita . |
| 5,178,053 | 1/1993 | Rudich, Jr. ........................ 91/361 |
| 5,230,272 | 7/1993 | Schmitz ............................. 91/361 |

FOREIGN PATENT DOCUMENTS 0529331  8/1956  Canada ........................... 122/479.3

*Primary Examiner*—Edward G. Favors
*Attorney, Agent, or Firm*—Cushman, Darby & Cushman

[57] ABSTRACT

A control system is provided for an actuating member including a controller, a solenoid valve electrically coupled to the controller, a fluid driven actuator operatively coupled to the solenoid valve, an actuating member operatively coupled to the fluid driven actuator, a potentiometer operatively coupled to the actuating member for converting a rotational position of the actuating member into a proportional electrical resistance, signal converting means for converting the electrical resistance to a proportional electrical current, and means for conducting the current to the controller. The controller includes means for comparing the current to a control signal indicative of a desired position of the actuating member, and means for generating a voltage pulse to the solenoid valve to displace the fluid driven actuator and move the actuating member to the desired position. A method utilizing the above system is also provided.

14 Claims, 1 Drawing Sheet

BURNER TILT FEEDBACK CONTROL

BACKGROUND OF THE INVENTION

1. Field of the Invention

This invention relates to a feedback control system, and more particularly, to a feedback system for controlling the position of tilting burners of a coal-fired furnace.

2. Description of Related Art

In the operation of present-day steam generating units, it is common to physically raise or lower the burners over a considerable distance to make use of more or less heat absorption surface in the furnace and thereby effect a wide range control of the temperature of the combustion gases leaving the furnace. Thus, burner tilt-drive devices have been developed to facilitate movement of the burners at each corner of the furnace. Conventionally, such devices include pneumatic cylinders which manipulate rotary actuators to control the position of the burners. The pneumatic cylinders include a piston which divides a cylindrical housing into first and second chambers on opposite sides of the piston. To adjust the burner, pneumatic fluid is supplied to or vented from the first and second chambers.

The Clean Air Act Amendment places an emphasis on low NOx emission, thus necessitating tighter control of burner tilt to improve combustion. Conventionally, control of the burner tilt corners had been done collectively, to reduce cost. However, with the need for tighter burner control, it has been proposed to isolate each burner corner and provide individual control thereof. Further, to ensure optimum combustion, feedback position for each burner tilt device at each burner corner has been proposed. However, to establish such feedback, the rotational position of the final control element must be monitored, requiring that the feedback device be exposed to the excessive heat of the furnace. Such devices may thus be exposed to temperatures exceeding 240° F. consequently, feedback devices tend to degrade with excessive heat and ultimately induce errors in the positioning of the burners tilt devices. In addition, conventional control systems have included linkages which may induce further errors. Even further, individual control of burner corners utilizing conventional feedback control systems generally requires high cost modifications to existing systems.

SUMMARY OF THE INVENTION

An object of the present invention is to provide individual corner feedback control of a tiltable burner position having control elements capable of withstanding a high operating temperature while ensuring high accuracy at low cost. In accordance with the principles of the present invention, this objective is obtained by providing a control system for an actuating member comprising a controller, a valve member electrically coupled to the controller, a fluid driven actuator operatively coupled to the valve member, an actuating member operatively coupled to the fluid driven actuator, a potentiometer operatively coupled to the actuating member for converting a rotational position of the actuating member into a proportional electrical resistance, signal converting means for converting the electrical resistance to a proportional electrical current, and means for conducting the current to the controller. The controller includes means for comparing the current to a control signal indicative of a desired position of the actuating member, and means for generating a voltage pulse to the valve member to displace the fluid driven actuator to move the actuating member toward the desired position.

Other objects, features and characteristics of the present invention as well as the function of the related elements of the structure, and the combination of parts and economies of manufacture, will become more apparent upon consideration of the following detailed description and the appended claims with reference to the accompanying drawings, all of which form a part of this specification.

DETAILED DESCRIPTION OF THE PRESENTLY PREFERRED EXEMPLARY EMBODIMENT

Figure 1:
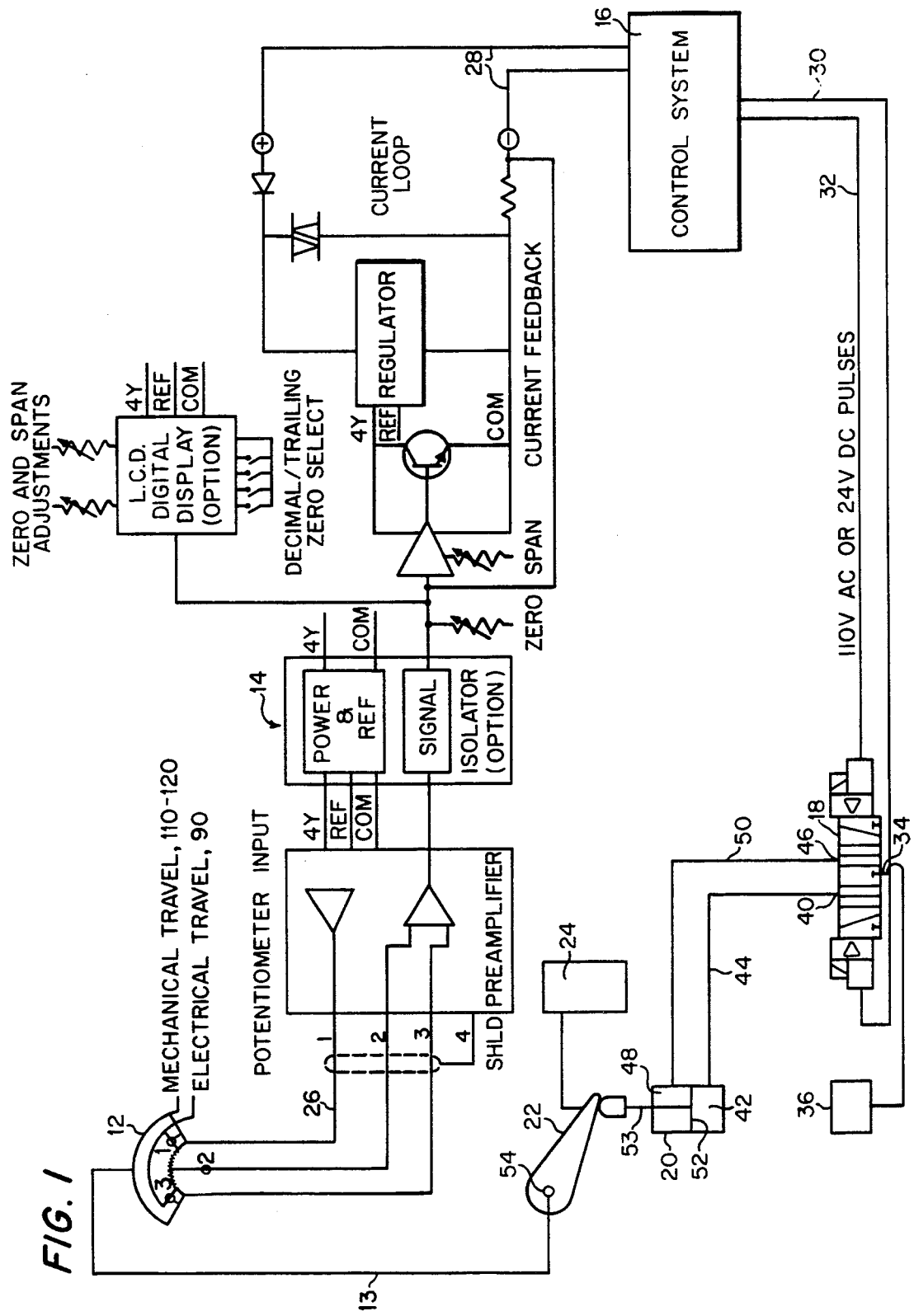
FIG. 1 is a schematic diagram illustrating a burner tilt feedback control system, provided in accordance with the principles of the present invention.

Referring to FIG. 1, a burner-tilt feedback control system is shown which embodies the principles of the present invention. The system 10 includes a potentiometer 12, a potentiometer transmitter, generally indicated at 14, a control system 16, a solenoid valve 18, a piston-cylinder 20 and an actuating member 22.

The potentiometer 12 is of pendulum type and made of materials so as to preferably be capable of operating in temperatures not exceeding 390 degrees F. This high temperature feature of the potentiometer 12 is desirable, since the potentiometer 12 is mounted proximate to the actuating member 22 and may be exposed to temperatures exceeding 240° F. when coupled to a final control element 24, such as a tiltable burner. Thus, errors due to degradation of the potentiometer as a result of heat exposure are minimized. The potentiometer 12 is mechanically coupled directly to the pivot point of the actuating member 22. The actuating member 22 is a rotary device which can be coupled to, or an integral part of, a tiltable burner. For ease of illustration, the direct mechanical coupling is shown by line 13 in FIG. 1. Thus, no linkage is required which may slip and induce errors. The potentiometer 12 is preferably Model CP-61-0101-1 or CP-17-0601-1 manufactured by Humphry or a similar device which produces a linear resistance proportional to the angular displacement of the actuating member 22, with an accuracy of approximately 1%. The potentiometer 12 has a mechanical travel of approximately 110° to 120° and an electrical travel of approximately 90°.

The electrical resistance from the potentiometer 12 is directed to the potentiometer transmitter 14. The potentiometer transmitter is conventional and preferably Model TW 8611 manufactured by Wilkerson or a similar device and will not be specifically described herein. The potentiometer transmitter 14 is capable of accepting resistance input from the potentiometer 12 and producing a 4–20 m.a.d.c. current output proportional to 0°–90° rotation of the actuating member 22. The potentiometer transmitter 14 feeds the 4–20 m.a.d.c. current back to the control system 16 via wire pair 28.

The control system 16 may be of conventional design, capable of delivering a voltage pulse output based on a current input. As shown in FIG. 1, the control system 16 sends a voltage pulse output to the solenoid valve 18 via wires 30, 32. The voltage may be either 110 volts AC or 24 VDC, as desired.

The solenoid valve 18 is preferably a double acting, spring return-to-center pneumatic solenoid such as Model AL 43533-BKN-5300A manufactured by Parker or similar device, which is capable of receiving a voltage pulse input. The voltage pulse input is sent to opposing ends of the solenoid 18 via wires 30 and 32. It is most preferable to provide a solenoid valve having a quick-turn on time so as to be compatible with the rapid pulsing sent by the control system. The solenoid 18 has a pneumatic input port 34 which is coupled to supply air 36. Preferably, air is supplied to the solenoid valve at 100 psig. The solenoid valve 18 includes two delivery ports. Delivery port 40 is coupled to a "raise" chamber 42 of the piston cylinder 20 via line 44. Delivery port 46 is coupled to the a "lower" chamber 48 of the piston-cylinder 20 via line 50. The solenoid also includes exhaust ports for exhausting pressure from one chamber while pressure is supplied to the other chamber of the piston-cylinder.

The piston-cylinder 20 is of conventional construction having an axial movable piston 52 enclosed in a cylinder housing. A shaft 53 of the piston 52 is directly mechanically coupled to the actuating member 22 at an end thereof, preferably for controlling a tiltable burner 24. The piston divides the housing into the "raise" chamber 42 and the "lower" chamber 48. Pneumatic pressure may be supplied to and vented from the chambers via the solenoid 18 to control the movement of the actuating member 22. Thus, pneumatic pressure delivered to the "raise" chamber will raise the piston and thus move the actuating member upward, due to rotation of the actuating member about its pivot point 54.

The operation of the feedback control system of the invention will be appreciated with reference to FIG. 1.

Data is inputted into the controller to generate a control signal indicative of a desired position of the final control element 24. The control system 16 sends the electrical control signal to the solenoid valve 18 which in-turn supplies pressure to and/or vents pressure from the appropriate chamber of the piston-cylinder 20. The piston-cylinder then moves the actuating member 22 as directed by the control signal. The actuating member is preferably coupled to the final control element 24, such as a tiltable burner. The actual position of the actuating member 22 is sensed by the potentiometer 12 and fed back to the control system via the potentiometer transmitter 14.

The control system 16 compares the feedback signal to the control signal. If, based on the above comparison, the actuating member 22 is not positioned to correspond to the desired set point, the control system 16 generates a difference signal. A "raise" or "lower" voltage pulse in accordance with the difference signal is directed to the solenoid, to raise or lower the piston and thus move the actuating member 22 in the proper direction to correct the error in its position. Voltage pulsing continues until the error is removed. It can be appreciated that the potentiometer 12 and potentiometer transmitter 14 can be used as a stand alone unit for position indication.

In the preferred embodiment, the potentiometer 12 is directly mechanically coupled to the final control element. Thus, mounting or positioning linkages are not required. As a result, it has been found that the feedback control system of the invention is accurate to approximately 1 degree of rotation of the actuating member 22. Such accuracy is difficult to obtain using conventional devices that require linkages.

The control system of the invention preferably provides pulse signals to adjust the position of the final control element. Such pulsing minimizes overshoot of the control element and is more accurate than conventional, continuous control devices, such as pilot valves or the like. Although the system has been described in a manner which utilizes pneumatic pressure, it can be appreciated that any fluid pressure can be used, including hydraulic pressure.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. A control system for an actuating member comprising:
   a controller;
   a valve member electrically coupled to said controller;
   a fluid driven actuator operatively coupled to said valve member;
   an actuating member operatively coupled to said fluid driven actuator;
   a potentiometer operatively coupled to said actuating member for converting a position of said actuating member into a proportional electrical resistance;
   signal converting means for converting said electrical resistance into a proportional electrical current; and
   means for conducting said current to said controller, said controller including means for comparing said current to a control signal indicative of a desired position of said actuating member, and means for generating a voltage pulse to said valve member to displace said fluid driven actuator and move the actuating member toward the desired position whereby feedback control of the position of the actuating member is provided,
   said actuating member controlling a tiltable burner in a coal fired furnace.

2. The control system as claimed in claim 1, wherein said fluid driven actuator is a piston-cylinder having a housing, a piston dividing the housing so as to define first and second chambers within the housing, said first chamber being coupled to a first delivery port of said valve member, said second chamber being coupled to a second delivery port of said valve member, whereby said valve member delivers fluid pressure to one of said first and second chambers while exhausting fluid pressure from the other of said first and second chambers to displace the piston.

3. The control system as claimed in claim 2, wherein said valve member includes first and second exhaust ports for respectively exhausting fluid pressure from said first and second chambers.

4. The control system as claimed in claim 1, wherein said valve member is a pneumatic, double action, spring return-to-center solenoid valve.

5. The control system as claimed in claim 1, wherein said potentiometer is composed of materials enabling to operate in temperatures not exceeding 390° F.

6. The control system as claimed in claim 1, wherein said potentiometer is directly mechanically coupled to said actuating member.

7. A control system for controlling a position of a tiltable burner in a coal fired furnace comprising:
   a controller;
   a solenoid valve electrically coupled to said controller, said solenoid valve having first and second outlet ports;
   a piston-cylinder having a housing, a piston dividing the housing so as to define first and second chambers within the housing, said first chamber being coupled with said first outlet port, said second chamber being coupled with said second outlet port;
   a rotary actuating member coupled to said piston and coupled to the burner tilt device;
   a potentiometer operatively coupled to said actuating member for converting a rotational position of said actuating member into a proportional electrical resistance;
   a signal converting element for converting said electrical resistance into a proportional electrical current; and
   current conducting means for conducting current to the controller,
   said controller including means for comparing said current to a control signal indicative of a desired position of the burner tilt device, and means for generating a voltage pulse to said solenoid valve, said solenoid valve delivering fluid pressure to one of said first and second chambers while exhausting fluid pressure from the other of said first and second chambers to displace the piston to move the tiltable burner toward said desired position whereby feedback control of the position of the tiltable burner is provided.

8. The control system of claim 7, wherein said potentiometer is composed of materials enabling it to operate in temperatures not exceeding 390° F.

9. The control system of claim 7, wherein said solenoid is a dual-action, spring return-to-center solenoid.

10. The control system of claim 7, wherein said potentiometer has a mechanical travel in the range of approximately 110° to 120° and an electrical travel of approximately 90°.

11. The control system of claim 7, wherein said potentiometer is directly mechanically coupled to said actuating member.

12. The control system of claim 7, wherein said fluid pressure is pneumatic pressure.

13. A method of controlling a position of a tiltable burner in a coal fired furnace comprising the steps of:
   providing a controller;
   providing a pneumatic solenoid valve electrically coupled to said controller;
   providing a pneumatic piston-cylinder pneumatically coupled to said solenoid valve;
   providing a rotary actuating member coupled to said piston-cylinder, said actuating member being coupled to the tiltable burner;
   providing a potentiometer operatively coupled to said actuating member for converting a position of said actuating member into a proportional electrical resistance;
   providing a signal converting means for converting said electrical resistance into a proportional electrical current;
   providing current conducting means for conducting said current to the controller,
   inputting data to said controller to generate a control signal indicative of a desired position of said tiltable burner;
   comparing a signal provided to said controller by said signal converting means to said control signal;
   generating a difference signal in accordance with a difference between said control signal and said signal provided by said signal converting means;
   generating a voltage pulse with said controller in accordance with said difference signal;
   conducting said voltage pulse to said solenoid valve, said solenoid valve one of venting and supplying fluid pressure to said piston-cylinder, said piston-cylinder moving said actuating member to adjust a position thereof until said actuating member and thus said tiltable burner are disposed at said desired position, thereby providing feedback control of the position of the tiltable burner.

14. A control system for an actuating member comprising:
   a controller;
   a valve member electrically coupled to said controller;
   a fluid driven actuator operatively coupled to said valve member;
   an actuating member operatively coupled to said fluid driven actuator;
   a potentiometer operatively coupled to said actuating member for converting a position of said actuating member into a proporational electrical resistance;
   signal converting means for converting said electrical resistance into a porportional electrical current; and
   means for conducting said current to said controller,
   said controller including means for comparing said current to a control signal indicative of a desired position of said actuating member, and means for generating a voltage pulse to said valve member to displace said fluid driven actuator and move the actuating member toward the desired position whereby feedback control of the position of the actuating member is provided,
   said actuating member being a tiltable burner in a coal fired furnace.

* * * * *